United States Patent [19]

Hilterhaus et al.

[11] 4,098,730

[45] Jul. 4, 1978

[54] NON-FLAMMABLE ORGANO-RED MUD POLYMERS, SOME OF WHICH ARE ELECTRICALLY CONDUCTIVE, AND PROCESS FOR THEIR MANUFACTURE

[75] Inventors: Karl Heinz Hilterhaus, Georgsmarienhütte; Franz Gottfried Reuter, Lemförde, both of Fed. Rep. of Germany

[73] Assignees: Metallgesellschaft Aktiengesellschaft, Frankfurt; Chemie-Anlagenbau Bischofsheim GmbH; Reuter Technologie GmbH, all of Fed. Rep. of Germany; part interest to each

[21] Appl. No.: 718,327

[22] Filed: Aug. 27, 1976

[30] Foreign Application Priority Data

Sep. 23, 1975 [DE] Fed. Rep. of Germany ....... 2542288

[51] Int. Cl.$^2$ .................. C08G 18/00; C08G 18/14
[52] U.S. Cl. ................... 521/107; 521/902; 521/118; 521/122; 260/37 N; 260/45.7 P; 528/55; 528/53; 260/858; 528/44
[58] Field of Search ............. 260/2.5 AM, 2.5 AK, 260/2.5 AJ, 37 N, 77.5 AB, 77.5 AC, 45.7 P, 858 R, 2.5 AW

[56] References Cited

U.S. PATENT DOCUMENTS

| | | | |
|---|---|---|---|
| 3,015,634 | 1/1962 | Ferrigno | 260/2.5 AK |
| 3,024,209 | 3/1962 | Ferrigno | 260/2.5 AK |
| 3,029,209 | 4/1962 | Ferrigno | 260/2.5 AK |
| 3,150,109 | 9/1964 | Ferrigno | 260/2.5 AK |
| 3,242,109 | 3/1966 | Showalter | 260/2.5 AK |
| 3,441,523 | 4/1969 | Dwyer | 260/2.5 AK |
| 3,640,920 | 2/1972 | Cear | 260/2.5 AK |
| 3,817,939 | 6/1974 | Allen | 260/2.5 AW |
| 3,860,565 | 1/1975 | Barber | 260/2.5 AW |
| 3,965,051 | 6/1976 | Markusch | 260/2.5 AK |
| 3,981,831 | 9/1976 | Markusch | 260/2.5 AK |
| 3,983,081 | 9/1976 | Dieterich | 260/77.5 SS |
| 4,042,536 | 8/1977 | Dieterich | 260/37 N |
| 4,052,347 | 10/1977 | Dieterich | 260/37 N |
| 4,057,519 | 11/1977 | Summers | 260/2.5 AK |

*Primary Examiner*—C. Warren Ivy
*Attorney, Agent, or Firm*—Larson, Taylor and Hinds

[57] ABSTRACT

This invention relates to a non-flammable homogeneous or foamed organo-red mud polymers, which essentially comprise the reaction product of red mud and a compound possessing at least two isocyanate groups.

36 Claims, No Drawings

NON-FLAMMABLE ORGANO-RED MUD POLYMERS, SOME OF WHICH ARE ELECTRICALLY CONDUCTIVE, AND PROCESS FOR THEIR MANUFACTURE

A great diversity of processes for the manufacture of homogeneous and foamed plastics containing mineral fillers, which may in addition contain flame-retardant additives, are known. It is true that plastics of low flammability can be manufactured in this way, but these plastics in many cases do not conform to fire regulations. Furthermore, these plastics are relatively expensive so that, eg., there is a real need for foams which are non-flammable, can be manufactured inexpensively and exhibit the desired physical properties, in particular in respect of the compressive strength at various densities.

It was therefore the object of the invention to provide non-flammable homogeneous and foamed plastics.

It has been found that this object is achieved by reacting red mud with a compound containing at least two isocyanate groups.

Accordingly, the invention relates to non-flammable homogeneous and foamed organo-red mud polymers which consist essentially of the reaction product of red mud and a compound possessing at least two isocyanate groups, and to a process for their manufacture. The process according to the invention for the manufacture of these non-flammable organo-red mud polymers is characterised in that red mud is reacted with a compound possessing at least two isocyanate groups, in the presence of one or more catalysts, and if appropriate of one or more volatile substances as blowing agents.

Red mud is a residue from the Bayer process for the production of alumina from bauxite. All the types of red mud encountered can be employed for the process according to the invention. As a rule, the red muds have the following composition:

| Average water content | | 35 to 40% |
| --- | --- | --- |
| Solids content up to | | 65% |
| including: | | |
| $SiO_2$ | up to | 10.5% |
| $Fe_2O_3$ | " | 41.0% |
| $TiO_2$ | " | 6.0% |
| CaO | " | 0.4% |
| $Na_2O$ | " | 7.5% |
| $Al_2O_3$ | " | 24.0% |

Further notes on red mud are to be found, for example, in Ullmanns Encyklopädie der Technischen Chemie, volume 3, page 384 et seq. See also Hackh's *Chemical Dictionary* (4th Ed.) page 440; Shreve, *Chemical Process Industries* (1956) pp. 434–5; and McGraw-Hill, *Encyclopedia of Science and Technology*, Vol. 1, pp. 290–1.

Since the reactants of the invention are to be processed by means of the machinery conventionally used in polyurethane chemistry, and since solutions of up to 1,500 cp are preferably processed on such machinery, the components employed according to the invention are either mixed with the subsequently enumerated additives or very viscous polyesters or polyethers, in order to increase the viscosity, or with water in order to lower the viscosity.

The isocyanates employed according to the invention include isocyanate compounds which possess at least two isocyanate groups. Preferably, isocyanate mixtures which predominantly contain polyisocyanate compounds with at least three isocyanate groups are employed according to the invention. Examples of these are the isocyanates commercially available under the registered tradenames "Desmodur 44 V" and "PAPI". The particularly preferentially employed polyisocyanate mixtures include the mixtures of polyisocyanates which contain practically no diisocyanates and monoisocyanates, such as are obtained in accordance with the process described in German Offenlegungsschrift (German Laid-Open Application) 2,105,193 (my reference: E1-58). In this process, an organic polyisocyanate mixture obtained by phosgenation of crude anilineformaldehyde resins, and predominantly containing the diphenylmethanediisocyanate isomers and higher-functional polyisocyanates with more than two benzene rings in the molecule, is separated into the diphenylmethanediisocyanate isomers and the higher-functional polyisocyanates.

Suitable organic diisocyanates include, for example, aliphatic diisocyanates, aromatic diisocyanates, alicyclic diisocyanates and heterocyclic diisocyanates, for example methylenediisocyanate, ethylenediisocyanate, propylenediisocyanate, butylenediisocyanate, cyclohexylene-1,4-diisocyanate, cyclohexylene-1,2-diisocyanate, tetramethylenediisocyanate or hexamethylenediisocyanate, arylenediisocyanates or their alkylation products, such as the phenylenediisocyanates, naphthylenediisocyanates, diphenylmethanediisocyanates, toluylenediisocyanates, di- or tri-isopropylbenzenediisocyanates, aralkyldiisocyanates, such as the xylylenediisocyanates, fluorine-substituted isocyanates, ethylene glycol diphenyl ether-2,2'-diisocyanate, naphthalene-1,4-diisocyanate, naphthalene-1,1'-diisocyanate, biphenyl-2,4'-diisocyanate, biphenyl-4,4'-diisocyanate, benzophenone-3,3'-diisocyanate, fluorene-2,7-diisocyanate, anthraquinone-2,6-diisocyanate, pyrene-3,8-diisocyanate, chrysene-2,8-diisocyanate, 3'-methoxyhexane-diisocyanate, octane-diisocyanate, $\omega,\omega'$-diisocyanato-1,4diethylbenzene, $\omega, \omega'$-diisocyanate-1,4-dimethylnaphthalene, cyclohexane-1,3-diisocyanate, 1-isopropylbenzene-2,4-diisocyanate, 1-chlorobenzene-2,4-diisocyanate, 1-fluorobenzene-2,4-diisocyanate, 1-nitrobenzene-2,4-diisocyanate, 1-chloro-4-methoxybenzene-2,5-diisocyanate, benzeneazonaphthalene-4,4'-diisocyanate, diphenyl ether-2,4-diisocyanate, diphenyl ether-4,4'-diisocyanate, and polyisocyanates containing isocyanurate groups.

Amongst these diisocyanates, 4,4'-diphenylmethanediisocyanate and/or its 2,4- and/or its 2,2'-isomer, 1,6-hexamethylenediisocyanate, 2,4-toluylenediisocyanate and/or 2,5-toluylenediisocyanate and m-xylylenediisocyanate are preferred.

According to the invention, it is of course also possible to use the NCO preadducts employed for the manufacture of polyurethanes. The NCO preadducts are compounds of fairly high molecular weight which possess at least two terminal NCO groups and which preferably have a molecular weight of 500 to 10,000 and especially of from 800 to 2,500. Preferably, these NCO preadducts contain from 1.5 to 5% of NCO groups. These NCO preadducts are manufactured in a known manner, by reacting compounds of fairly high molecular weight, containing OH groups, with an excess of polyisocyanate. The manufacture of such NCO preadducts is described, for example, in Angewandte Chemie 64, 523 to 531 (1952), Kunststoffe 42, 303 to 310 (1952), German Pat. No. 831,772, German Pat. No. 897,014, German Pat. No. 929,507 and U.S. Pat. No. 3,000,757.

The following may be mentioned as examples of suitable compounds of fairly high molecular weight which contain OH groups and are suitable for the manufacture of the NCO preadducts: polyesters, polyethers, polyester-amides, polythioethers and polyacetals.

Fairly high molecular weight compounds with terminal carboxyl, amino and mercapto groups are also suitable. Polysiloxanes which have groups which are reactive towards isocyanates may also be mentioned. Further customary compounds are described, for example, in J. H. Saunders and K. C. Frisch "Polyurethanes" Part 1, New York, 1962, pages 33 to 61, and in the literature cited there.

Any suitable organic diisocyanate can be used for the manufacture of the NCO preadducts, for example the diisocyanates mentioned above.

NCO preadducts with terminal isocyanate groups and containing carbon-carbon double bonds are easily obtainable by using exclusively, or in part, unsaturated polyesters for the manufacture of the NCO preadduct.

Isocyanate compounds which can be employed according to the invention which contain groups which either are ionic groups and/or behave as ionic groups in an alkaline reaction mixture, and the polymerizable compounds which can also be employed, are described, for example, in German Offenlegungsschriften (German Laid-Open Applications) 23 59 606, 23 59 608, 23 59 609, 23 59 610, 23 59 612, 23 10 559, 22 27 147 and 17 70 384. Amongst these, the isocyanate compounds which are halogenated, preferably chlorinated, and/or sulfonated, are employed preferentially. In part, the German Laid-Open Applications mentioned above also mention isocyanate compounds which do not carry ionic groups. These compounds are also suitable for the purposes of the invention.

Suitable catalysts are those of a type which is in itself known, for example tertiary amines, such as triethylamine, tributylamine, N-methyl-morpholine, N-ethyl-morpholine, N-coconut-morpholine, N,N,N',N'-tetramethyl-ethylenediamine, 1,4-diaza-bicyclo-(2,2,2)-octane, N-methyl-n'-dimethylaminoethylpiperazine, N,N-dimethylbenzylamine, bis-(N,N-diethylaminoethyl)adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole and, in particular, also hexahydrotriazine derivatives.

Tertiary amines which contain hydrogen atoms which are active towards isocyanate groups are, for example, triethanolamine, triisopropanolamine, N-methyl-diethanolamine, N-ethyldiethanolamine, N,N-dimethyl-ethanolamine and their reaction products with alkylene oxides, such as propylene oxide and/or ethylene oxide.

Further suitable catalysts are sila-amines with carbon-silicon bonds, such as are described, for example, in German Pat. No. 1,229,290, for example 2,2,4-trimethyl-2-silamorpholine and 1,3-diethylaminomethyl-tetramethyldisiloxane.

Further suitable catalysts are nitrogen-containing bases such as tetraalkylammonium hydroxides, alkali metal hydroxides, such as sodium hydroxide, alkali metal phenolates, such as sodium phenolate, or alkali metal alcoholates, such as sodium methylate. Hexahydrotriazines may also be employed as catalysts.

Organic metal compounds, especially organic tin compounds, can also be employed as catalysts according to the invention.

Preferred organic tin compounds are tin (II) salts of carboxylic acids, such as tin (II) acetate, tin (II) octoate, tin (II) ethylhexoate and tin (II) laurate, and the dialkyl-tin salts of carboxylic acids, such as, for example, dibutyl-tin diacetate, dibutyl-tin dilaurate, dibutyl-tin maleate or dioctyl-tin diacetate.

Further examples of catalysts which can be used according to the invention, and details of the mode of action of the catalysts, are described in the Kunststoff-Handbuck (Plastics Handbook), volume VII, edited by Vieweg and Höchtlen, Carl Hanser-Verlag, Munich 1966, for example on pages 96 to 102.

The catalysts are as a rule employed in an amount of between about 0.001 and 10% by weight, based on the amount of isocyanate.

In particular, preferred catalysts are those which possess reactive groups, such as hydroxyl radicals and amino radicals, which are able to react with isocyanates and are built into the polymer structure during the formation of the polymer and, where possible, contribute to a cyclization of the isocyanates to give isocyanurates.

Examples of further suitable catalysts are therefore 2,4,6-tris(dimethylaminomethyl)-phenol, methyldiethanolamine, N-methyldipropyldiamine, dibutylaminoethanol, dimethylamino-2-propanol, diethylaminoethoxyethanol and o-tolylpropanolamine. Further suitable catalysts include 1,4-diaza(2,2,2)bicyclooctane (DABCO ®), also referred to as triethylenediamine), N,N'-bis-dimethyldiethyl-piperazine, hexamethyltriethylenetetramine, dimethylbenzylamine, catalyst A-1 (UCC), dimethylcetylamine, 1,8-diazabicyclo[5,4,0]undec-7-ene and tetramethyl-1,3-butanediamine.

Particularly suitable catalysts for the purposes of the invention are compounds which can be described as zwitterion compounds, ie. compounds which contain at least one group having a positive charge and at least one group having a negative charge in the molecule and which preferably additionally contain at least one hydrogen atom which is active according to a Zerewitinow test. The compounds preferentially employed from this group thus include those of the general formula

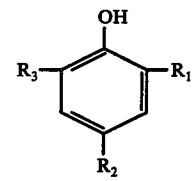

where the radicals $R_1$, $R_2$ and $R_3$ are hydrogen or a radical of the general formula

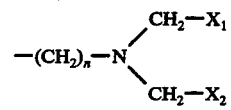

where $n$ is an integer from 1 to 25 and the radicals $X_1$ and $X_2$ are hydrogen and/or alkyl radicals of 1 to 25 carbon atoms, and the radicals $R_1$, $R_2$ and $R_3$ can be different, but not more than two of the radicals $R_1$, $R_2$ and $R_3$ are hydrogen, and the alkyl radicals can carry primary and/or secondary hydroxyl groups.

Amongst these, tertiary amino compounds with a phenolic hydroxyl group, which additionally contain at least one further hydroxyl group are particularly preferred, ie. tertiary amino compounds of the general formula

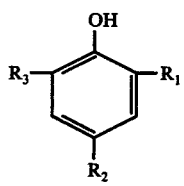

where the radicals $R_1$, $R_2$ and $R_3$ are hydrogen or a radical of the general formula

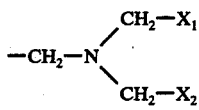

where the radicals $X_1$ and/or $X_2$ are hydrogen, alkyl of 1 to 25 carbon atoms or the radical $—(CH_2)_mOH$ ($m$ being an integer from 0 to 25), but not more than two of the radicals $R_1$, $R_2$ or $R_3$ are hydrogen and at least one of the radicals $R_1$, $R_2$ and $R_3$ must carry a hydroxyl group.

Tertiary amino compounds which are employed preferentially according to the invention, fall under the above general formula and possess zwitterion properties are 2,4,6-tris-(ethyl-2-hydroxyethylaminomethyl)-phenol of the formula

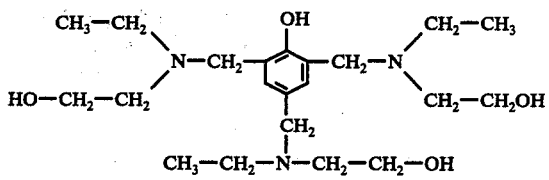

and 2,4,6-tris-(dimethylaminomethyl)-phenol.

Preferably, metal ions and/or complexes of these are also added in order to stabilize the reaction mixture.

Suitable complex-forming agents employed according to the invention are particularly those capable of forming five-membered and six-membered rings. Five-membered rings are formed, for example, if two adjacent OH groups are present on the complex-forming agent, as is the case, for example, with the glycols, triols and sugar-alcohols. Furthermore, the oxalato, glycino and ethylenediaminotetraacetic acid complexes can also be employed.

Six-membered rings are formed if the complex-forming agent contains double bonds. Such cases include, for example, acetylacetonato- and salicylato-complexes.

Furthermore, quadridentate ligands, which form both six-membered and five-membered rings, can also be employed. An example is the bis-(acetylacetone)-ethylenediimine complex. Accordingly, complexes which because of the absence of an ion are externally electrically neutral are preferred.

Amongst the organic complex-forming agents, polyols which contain at least two hydroxyl groups in adjacent positions or in which there is at most one further carbon atom between the carbon atoms carrying hydroxyl groups, are preferred. Suitable compounds of this type include, for example, ethylene glycol, glycerol, mannitol, 1,2-dihydroxypropane, phenylglycol, pyrocatechol, monoethers of glycerol, 2,3-naphthalenediol, 1,8-naphthalenediol and 2-chloro-4-(1,1,3,3-tetramethyl-butyl)-6-hydroxymethyl-phenol.

Instead of, or together with, the isocyanates described above, it is also possible to employ thioisocyanates with at least two isocyanate or thioisocyanate groups, thiocyanates, selenocyanates and tellurocyanates, or other polymerizable compounds.

It has been found, according to the invention, that it is advantageous to carry out the reaction in the additional presence of a compound which lowers the pH value of the reaction mixture. Suitable compounds of this nature include, depending on the reaction mixture employed, ammonium chloride, barium chloride, barium nitrate, fuller's earths, disodium phosphate, calcium magnesium carbonate, calcium bromide, calcium chloride calcium iodate, potassium aluminum sulfate, potassium fluoride, potassium borofluoride, potassium bromide, potassium carbonate, potassium metabisulfite, potassium silicofluoride, magnesium carbonate, magnesium fluoride, magnesium oxide, magnesium phosphate, monoammonium phosphate, monosodium phosphate, sodium antimonate, sodium acetate, sodium bichromate, sodium bifluoride, sodium bisulfate, sodium bromide, sodium fluoride, sodium hexametaphosphate, sodium metabisulfite, sodium silicofluoride, sodium sulfite, tetrapotassium pyrophosphate, zinc acetate, zinc carbonate and boric acid.

When manufacturing foams in accordance with the process of the invention, it is preferred additionally to employ blowing agents, especially inert liquids which boil between $-25°$ and $+50°$ C, preferably between $-15°$ and $+40°$ C. These are, in particular, alkanes, alkenes, halogen-substituted alkanes or alkenes or dialkyl ethers. Such substances are, for example, saturated or unsaturated hydrocarbons with 4 to 5 carbon atoms, such as isobutylene, butadiene, isoprene, butane, pentane and petroleum ether, the halogenated saturated or unsaturated hydrocarbons such as methyl chloride, methylene chloride, fluorotrichloromethane, difluorodichloromethane, trifluorochloromethane, chloroethane, vinyl chloride and vinylidene chloride. Trichlorofluoromethane, vinyl chloride and $C_4$ hydrocarbons, for example butane, monofluorotrichloromethane (commercially available under the registered trademarks Frigen 11 and Kaltron 11), dichlorodifluoromethane and trichlorotrifluoroethane have proved most suitable. Monofluorotrichloromethane is preferred. Stirred-in air can serve as an additional blowing agent.

Of course, when manufacturing the foam at an elevated temperature, higher-boiling blowing agents can also be used as an additive, for example hexane, dichloroethane, trichloroethane, carbon tetrachloride or light gasoline. However, the water contained in the mixture can also act as the blowing agent. Furthermore, fine metal powders, for example calcium, magnesium, aluminum or zinc, can act as the blowing agent by evolving hydrogen and at the same time exert a curing and reinforcing effect.

The blowing agents are employed in amounts of 0–50% by weight, preferably 2–30% by weight, based on the reaction mixture.

Instead of the abovementioned volatile blowing agents it is also possible according to the invention, and advantageous, to employ compounds which eliminate a gas. Examples of such blowing agents include bicarbonates, for example sodium bicarbonate, ammonium carbonate or ammonium nitrite or organic nitrogen compounds which on heating evolve nitrogen, for example dinitrosopentamethylenediamine, barium azodicarboxylate, azodicarbonamide, substituted triazole, diphenylsulfone-3,3'-disulfohydrazide or azodiisobutyronitrile. Where appropriate, these blowing agents can be used together in a combination which lowers the decomposition temperature. Particularly interesting possibilities arise if the foams according to the invention are manufactured using compounds which eliminate $CO_2$ and which perform a double function. Once $CO_2$ has been formed, it causes not only foaming but also a precipitation of certain dissolved compounds. Of course, these compounds which eliminate gases can also be used as a mixture with volatile compounds serving as blowing agents (for example the fluorohydrocarbons).

In order to form a particularly fine cell structure it is advisable to admix nucleating and cell-regulating substances. Numerous compounds are suitable for use as nucleating substances, examples being finely divided inert solids, for example silicon dioxide or aluminum oxide, if appropriate together with zinc stearate, or amorphous silicic acids or metal silicates. Amongst these, silicon dioxide precipitated from colloidal solution is preferred as a nucleating agent.

Suitable cell regulators include silicone oils based on polysiloxanes, for example the oils DC-193, DC-194, DC-195, L-532 and L-5340 from Union Carbide Corporation, the oils SF 1066 and SF 1109 from General Electric, the DC grades of oils from Wacker, Tegiloxan from Goldschmidt and Emulgin 286 from Henkel. Amongst these, DC-195, L-5340 and Emulgin 286 are preferred.

Preferably, surface-active additives are also used when manufacturing the foams according to the invention, so as to facilitate foaming by reducing the surface tension of the system. In addition, the surface-active additives impart certain desirable properties to the foams, through additionally influencing the cell structure. Suitable compounds include, for example, surfactants (commercially available under the name Emulgin 286, manufactured by Henkel) as well as the non-ionic alkylphenol oxyethylates having a degree of oxyethylation of about 6 to 20. The use of Emulgin 286 and of alkylphenol oxyethylates having a degree of oxyethylation of 9 to 10 is preferred.

The surface-active additives can at the same time also act as foam stabilizers. In addition, the following may be employed as foam stabilizers: silicone oil (commercially available under the name Si L 5340, manufactured by Union Carbide Corporation) and Emulgin 286 from Henkel.

In order further to increase the non-flammability of the homogeneous polymers or foams of the invention, fire-retardant substances are added to the system. These substances can be dissolved or dispersed in one or both components. The fire-retardant substances which are soluble in the aqueous component include, for examaple, trisodium phosphate.12 $H_2O$. The insoluble fire-retardant additives which furthermore at the same time act as reinforcing agents include, for example, kieselguhr (diatomaceous earth), hydrated aluminum oxide, magnesium silicate, asbestos powder, chalk, asbestos fibers and glass fibers.

Particularly suitable organic flameproofing agents are compounds based on phosphorus and halogen, for example the compound of the formula

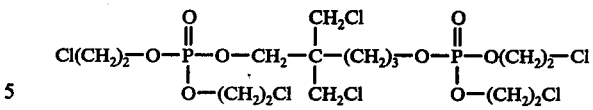

sold by Monsanto under the name "Phosgard 2xc20". This compounds contains about 35% of chlorine and about 11% of phosphorus. It is inert towards NCO groups. The particular advantages of this phosphonate ester are that the viscosity of very viscous polyisocyanate materials can be lowered substantially by mixing with this phosphonate ester and that the material is emulsifiable in water if suitable emulsifiers are used. The fire-retardant properties are not only attributable to the relatively high phosphorus content and chlorine content, but also to the increase in the oxygen index which — on exposure to a flame — causes a hard charred layer to be produced immediately, which does not propagate the flame further. In addition to the flameproofing properties, the ester serves the purpose of assisting, by means of the P and Cl atoms, in neutralizing the alkaline reactant. The material is odorless and of low toxicity.

In principle the polymers of the invention can be filled with substantial amounts of fillers without losing their pattern of high-performance properties; very particularly preferred fillers, which exhibit a marked reinforcing action, are water-binding (hydraulic) additives of organic or inorganic nature, especially hydraulic cements, synthetic anhydrite, gypsum and quicklime.

If sufficient amounts of such water-binding additives are used, even aqueous solutions which have a high water content, for example 60–90%, can be employed for forming the xerosol.

Hydraulic cements which can be employed are, in particular, Portland cement, quick-setting cement, blast furnace cement, lightly burned cement, sulfate-resistant cement, masonry cement, natural cement, lime cement, gypsum cement, pozzolan cement and calcium sulfate cement.

The water-binding additives are employed to manufacture hard materials and are preferably used in an amount which suffices to bind 40–100% of the water introduced with the aqueous phase. In particular, the amount of the water-binding additives is 50 to 400% by weight of the amount of "total mixture" (sum of the 2 main components).

The binding of the water, introduced with the aqueous phase, by hydraulic binders, especially cement, lime or anhydrite, is of considerable importance with a view to the behavior of the materials in case of fire. The water is released slowly and endothermically when exposed to heat and accordingly exhibits a powerful fire-retardant action.

In addition, diatomaceous earth is also particularly suitable for the purposes of the invention, since it also simultaneously fulfils several functions. As a result of its ability to absorb an amount of water which is a multiple of its volume, it assists in "drying out" the foam without shrinkage of the latter. Furthermore, diatomaceous earth is inert against both acids and bases, and is non-combustible. It can be mixed with either component and because of its fine distribution in the two components produces a great increase in the "internal surface area", which manifests itself advantageously, when manufacturing the foams according to the invention, in initiating an emulsifying action (formation of a protective colloid).

The fillers to be employed and the inert adjuvants can, before mixing, also be steeped in, or impregnated or sprayed with, one of the liquid components of the mixture, for example in order to improve the adhesion or flow.

The amount of additives introduced depends above all on the viscosity of the mixture. Preferably, the amount of additives introduced is between 0.1 and 20% by weight, relative to the weight of the reaction mixture employed. In addition to these fire-retardant additives or fillers, it is, of course, possible also to add pigments or dyes to the mixture which is to be foamed, if colored products are desired.

Further examples of surface-active additives and foam stabilizers, cell regulators, reaction retarders, stabilizers, fire-retardant substances, plasticizers, dyes, fillers, fungistatic materials and bacteriostatic materials, which, according to the invention, are added optionally, and details regarding the method of use and mode of action of these additives, are described in the Kunststoff-Handbuch (Plastics Handbook), volume VI, edited by Vieweg and Höchtlen, Carl Hanser-Verlag, Munich 1966, for example on pages 103 to 113.

Depending on the properties which the polymers according to the invention are to exhibit, it is possible to employ, as additional reactants, polyesters and polyethers, such as are employed in polyurethane chemistry, and such as have, in part, already been described above in conjunction with the manufacture of the NCO preadducts which can be employed according to the invention. Since the polyols, that is to say the polyesters and polyethers, have been described in great detail in the polyurethane literature, a closer description of these compounds will be dispensed with here.

Furthermore, particles of plastics, preferably in the form of an aqueous dispersion of a plastic, can also be introduced into the reaction mixture according to the invention.

Furthermore, it has proved advantageous, for various applications, to add waterglass, preferably sodium waterglass or potassium waterglass, to the aqueous starting component. The waterglasses which can be employed according to the invention are described, for example, in Ullmanns Encyklopädie der Technischen Chemie, volume 15, page 732 et seq.

A further interesting subject of the present invention comprises the electrically conductive polymers. When manufacturing foams, electrically conductive particles, in an amount which result in an electrically conductive foam, are introduced, in addition to the adjuvants already mentioned. Metal powders, inert particles coated with noble metals, for example metallized glass beads, plastic particles which have been rendered electrically conductive, particles of electrically conductive plastics and the carbon blacks and graphites conventionally used in the manufacture of electrically conductive plastics can be employed as electrically conductive particles. Of course, mixtures of the abovementioned substances can also be used, as can their aqueous dispersions.

The components mentioned above are mixed in the manner known from polyurethane chemistry. As usual, a component A and a component B are first prepared, and these are then mixed after addition of appropriate adjuvants and catalysts. The start time of the mixtures, for the production of foams, prepared in this way is in general between 5 seconds and 100 seconds or more, and can be regulated as desired. If required, the components can be warmed to reduce the start time. Preferably, the foams according to the invention have a density of between 15 and 750 kg/m$^3$.

For special applications it can be of advantage if the polymers obtained according to the invention are subjected to a subsequent heat treatment at temperatures above 100° C, especially above 130° and up to 250° C.

The examples which follow illustrate the invention without however limiting it thereto. Unless stated otherwise, percentages and parts are by weight.

EXAMPLE 1

24 parts by weight of a red mud of the following composition:

| | | |
|---|---|---|
| Water (average) | | 35 to 40% |
| Solids up to comprising: | | 63% |
| $SiO_2$ | up to | 10.5% |
| $Fe_2O_3$ | " | 41% |
| $TiO_2$ | " | 6% |
| CaO | " | 0.4% |
| $Na_2O$ | " | 7.5% |
| $Al_2O_3$ | " | 24% | referred to, in the examples which follow, as the starting component, are homogenized with 0.6 part by weight of 2,4,6-tris-(dimethylaminomethyl)-phenol and 4.8 parts by weight of water. 22.3 parts by weight of Desmodur 44 V 20 (a product of Bayer AG), which consists of a polyisocyanate with about 50% of monomeric MDI, and 0.2 part by weight of silicone oil 193 of Dow-Corning are vigorously mixed into the preceding mixture for 15 seconds. A fine-pored, homogeneous foam, having a density of 35 kg/m$^3$, is produced.

EXAMPLE 2

40.8 parts by weight of starting component are homogenized with 1 part by weight of 2,4,6-tris-(dimethylaminomethyl)-phenol and 8.2 parts by weight of water. The viscous mass is then stirred vigorously with 28.8 parts by weight of Desmodur 44 V 20 of Bayer AG, 0.3 part by weight of silicone oil 193 of Dow-Corning and 7 parts by weight of a phosphonate ester (Phosgard 2xc20 of Monsanto). A coarse-pored foam of density 184 kg/m$^3$ is produced.

EXAMPLE 3

20.4 parts by weight of the starting component are homogenized with 0.5 part by weight of 2,4,6-tris-(dimethylaminomethyl)-phenol and 4.1 parts by weight of water. A mixture of the following components is added, with vigorous stirring: 9.7 parts by weight of Desmodur 44 V 20 of Bayer AG, 0.2 part by weight of silicone oil 193 of Dow-Corning, 8.6 parts by weight of Phosgard 2xc20 of Monsanto, 11.5 parts by weight of sodium silicofluoride ($Na_2SiF_6$) and 5 parts by weight of a plastic dispersion, Lutofan 1150 D of BASF. After stirring for 15 seconds, a fine-pored foam having a density of 79 kg/m$^3$ is produced.

EXAMPLE 4

27.2 parts by weight of the starting component are homogenized with 0.7 part by weight of 2,4,6-tris-(dimethylaminomethyl)-phenol and 5.4 parts by weight of water. A mixture consisting of 21.5 parts by weight of Desmodur 44 V 20 of Bayer AG, 0.5 part by weight of silicone oil 193 of Dow-Corning, 19.2 parts by weight of Phosgard 2xc20 of Monsanto and 25.5 parts by weight of sodium silicofluoride ($Na_2SiF_6$) is then vigorously stirred in. After leaving the mixture for about 15 seconds, a fine-pored foam having a density of 38 $kg/m^3$ is produced.

EXAMPLE 5

40.8 parts by weight of the starting component are homogenized with 1 part by weight of 2,4,6-tris-(dimethylaminomethyl)-phenol and 8.2 parts by weight of water. A mixture consisting of 13.2 parts by weight of Desmodur 44 V 20 of Bayer AG, 0.3 part by weight of silicone oil 193 of Dow-Corning, 11.8 parts by weight of Phosgard 2xc20 of Monsanto, 10 parts by weight of sodium silicofluoride ($Na_2SiF_6$), 5.7 parts by weight of diatomaceous earth, trademark Celatom MW 31, from Chemag and 9 parts by weight of trichlorofluoromethane is prepared and vigorously stirred into the preceding mixture. A coarse-pored foam having a density of 95 $kg/m^3$ is produced.

EXAMPLE 6

A non-cellular product is obtained by the following formulation: 22.1 parts by weight of the starting component are homogenized with 1.3 parts by weight of 2,4,6-tris-(dimethylaminomethyl)-phenol and 22.1 parts by weight of sodium waterglass of 58°/60° Bè strength. A mixture consisting of 13.0 parts by weight of Desmodur 44 V 20 of Bayer AG, 0.3 part by weight of silicone oil 193 of Dow-Corning, 11.7 parts by weight of Phosgard 2xc20 of Monsanto and 15.5 parts by weight of sodium silicofluoride ($Na_2SiF_6$) is vigorously stirred in. The mixture does not foam up, and solidifies, with marked exothermicity, to give a brick-like mass.

EXAMPLE 7

28.6 parts by weight of the starting component are homogenized with 0.7 part by weight of 2,4,6-tris-dimethylaminomethyl)-phenol, 5.7 parts by weight of water and 15 parts by weight of sodium waterglass of 58°/60° Bè strength. A mixture consisting of 16.1 parts by weight of Desmodur 44 V 20 of Bayer AG, 0.4 part by weight of silicone oil 193 of Dow-Corning, 14.4 parts by weight of Phosgard 2xc20 of Monsanto and 19.1 parts by weight of sodium silicofluoride ($Na_2SiF_6$) is stirred into the preceding mixture. After leaving the mixture to stand for about 10 seconds, a fine-pored foam having a density of 166 $kg/m^3$ is produced.

EXAMPLE 8

24.3 parts by weight of the starting component are homogenized with 24.3 parts by weight of waterglass of 58°/60° Bè strength and 1.4 parts by weight of 2,4,6-tris-(dimethylaminomethyl)-phenol. A mixture consisting of 13.2 parts by weight of Desmodur 44 V 20 of Bayer AG, 0.3 part by weight of silicone oil 193 of Dow-Corning, 11.8 parts by weight of Phosgard 2xc20 of Monsanto, 15.7 parts by weight of sodium silicofluoride ($Na_2SiF_6$) and 9 parts by weight of trichlorofluoromethane are vigorously stirred into the preceding mixture. After leaving the mixture to stand for 8 seconds, a fine-pored foam having a density of 64 $kg/m^3$ is produced.

EXAMPLE 9

21.9 parts by weight of the starting component are homogenized with 21.9 parts by weight of waterglass of 58°/60° Bè strength, resulting in a lowering of the viscosity. A mixture consisting of 13.2 parts by weight of Desmodur 44 V 20 of Bayer AG, 0.3 part by weight of silicone oil 193 of Dow-Corning, 11.8 parts by weight of Phosgard 2xc20 of Monsanto, 5 parts by weight of diatomaceous earth, trademark Celatom MW 31, of Chemag and 4.5 parts by weight of trichlorofluoromethane is vigorously stirred into the preceding mixture. After leaving the mixture to stand for some time, a fine-pored foam having a density of 130 $kg/m^3$ is produced.

EXAMPLE 10

50 parts by weight of the starting component are homogenized with 0.5 part by weight of 2,4,6-tris-(dimethylaminomethyl)-phenol and 10 parts by weight of a complex-forming agent of the polyhydroxycarboxylate type, of Degussa, having a molecular weight of 5,400. A mixture consisting of 19.3 parts by weight of Desmodur 44 V 20 of Bayer AG, 0.5 part by weight of silicone oil 193 of Dow-Corning, 17.3 parts by weight of Phosgard 2xc20 of Monsanto and 22.9 parts by weight of sodium silicofluoride ($Na_2SiF_6$) is vigorously stirred into the preceding mixture. After leaving the mixture to stand for 8 seconds, a fine-pored foam having a density of 57 $kg/m^3$ is produced.

According to the invention, it is thus possible to manufacture foams which are expanded either by the addition of external blowing agents (for example halohydrocarbons) or by the water present in the formulation. It is true that it must be assumed that when external blowing agents are employed, the foam is expanded by a mixture of factors, that is to say by the external blowing agent and by the evolution of $CO_2$ gas caused by the presence of water. However, when waterglass is added, the evolution of $CO_2$ is suppressed to the point that in every case an external blowing agent must be employed to form the foam. Specifically, therefore, non-cellular plastics are obtained in the presence of waterglass and the absence of external blowing agents.

The complex-forming agents employed according to the invention have an advantageous effect on the viscosity. Furthermore, when using such materials, the densities can be lowered even further, for somewhat comparable pressure. Preferably, the poly(hydroxycarboxylates) of Degussa are employed. These are products which are obtained by oxidative copolymerization of acroleins and acrylic acid after a Cannizzaro reaction and treatment with alkali, at a molecular weight of 5,000 – 6,000. Preferably, they are used as aqueous solutions of their sodium salts.

What is claimed is:

1. A method of making a red mud containing organo polymer which comprises reacting a compound possessing at least two isocyanate groups in the presence of a catalyst and red mud.

2. A red mud containing organo polymer produced by the process of claim 1.

3. A process according to claim 1, wherein the reaction is carried out in the presence of 2,4,6-tris-(dimethylaminomethyl)-phenol.

4. A method according to claim 1 wherein the reaction mixture includes a blowing agent present in an amount sufficient to form a foamed polymer.

5. A method according to claim 1 wherein the reaction mixture includes a silicate solution.

6. A method according to claim 5 wherein said silicate solution is selected from the group consisting of aqueous sodium silicate and aqueous potassium silicate.

7. A method according to claim 1 wherein said isocyanate compound is an undistilled crude isocyanate obtained by the phosgenation of crude aniline-formaldehyde.

8. A method according to claim 1 wherein said isocyanate compound comprises a higher-functional polyisocyanate with more than two benzene rings in the molecule.

9. A method according to claim 1 wherein said isocyanate compound is a pre-adduct having terminal isocyanate groups.

10. A method according to claim 9 wherein said pre-adduct contains carbon-carbon double bonds.

11. A method according to claim 1 wherein said isocyanate compound comprises a group which is ionic or which behaves as an ionic group in the reaction mixture.

12. A method according to claim 1 wherein said isocyanate compound is halogenated or sulfonated.

13. A method according to claim 12 wherein said isocyanate compound comprises a halogenated isocyanate.

14. A method according to claim 1 wherein said isocyanate compound comprises a chlorinated isocyanate.

15. A method according to claim 1 wherein the reaction mixture includes a member selected from the group consisting of polyester polyols and polyether polyols.

16. A method according to claim 1 wherein said catalyst comprises at least one zwitterion compound which contains at least one group with a positive charge and at least one group with a negative charge in the molecule and which possesses at least one hydrogen atom which is active according to a Zerewitinow test.

17. A process according to claim 1 wherein the reaction mixture includes a compound which lowers the pH of the reaction mixture.

18. A method according to claim 17 wherein the pH lowering compound comprises a metal silicofluoride.

19. A method according to claim 1 wherein the reaction mixture includes at least one compound capable of forming a complex with metal compounds.

20. A method according to claim 19 wherein the complex-forming compound comprises a polyol containing two hydroxyl groups on carbon atoms which are adjacent or separated by at most one carbon atom.

21. A method according to claim 1 wherein the reaction mixture includes an emulsifier.

22. A method according to claim 21 wherein said emulsifier comprises an alkylphenoloxyethylate having a degree of oxyethylation of 10.

23. A method according to claim 4 in which said blowing agent comprises a volatile blowing agent.

24. A method according to claim 23 wherein said volatile blowing agent comprises monofluorotrichloromethane.

25. A method according to claim 4 wherein said blowing agent comprises a compound which evolves a gas.

26. A method according to claim 25 wherein said gas is selected from the group consisting of $CO_2$ and nitrogen.

27. A method according to claim 25 wherein said blowing agent comprises a bicarbonate compound.

28. A method according to claim 4 wherein said blowing agent comprises a volatile blowing agent and a compound which evolves gas.

29. A method according to claim 1 wherein the reaction mixture includes a flameproofing agent.

30. A method according to claim 29 wherein the flame-proofing agent comprises a halogenated phosphoric acid ester.

31. A method according to claim 1 wherein the reaction mixture includes at least one member selected from the group consisting of fillers and pigments.

32. A method according to claim 1 wherein the reaction mixture comprises diatomaceous earth.

33. A method according to claim 1 wherein the reaction mixture comprises electrically conductive particles in an amount to produce an electrically conductive polymer.

34. A method according to claim 1 wherein said electrically conductive particles comprise a material selected from the group consisting of metal, carbon black, graphite, and electrically conductive plastic.

35. A method according to claim 1 wherein a dispersion of plastic particles is mixed with said red mud or with said isocyanate compound prior to the reaction.

36. A process according to claim 16, wherein the zwitterion compound used is a tertiary amino compound possessing at least one phenolic hydroxyl group, preferably a compound of the general formula

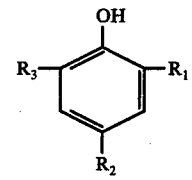

where $R_1$, $R_2$ and $R_3$ are identical or different and each is hydrogen or a radical of the general formula

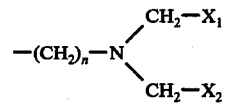

where $n$ is an integer from 1 to 25, preferably 1, and the radicals $X_1$ and/or $X_2$ are hydrogen, hydroxyl or straight-chain or branched alkyl radicals of 1 to 25 carbon atoms which may carry primary and/or secondary hydroxyl groups, but not more than two of the radicals $R_1$, $R_2$ or $R_3$ are hydrogen and preferably at least one of the radicals $R_1$, $R_2$ and $R_3$ carries a hydroxyl group.

* * * * *